(12) United States Patent
Shoji et al.

(10) Patent No.: US 10,756,827 B2
(45) Date of Patent: Aug. 25, 2020

(54) ELECTRODE FOR INTRA-BODY COMMUNICATION AND WEARABLE DEVICE

(71) Applicants: SONY MOBILE COMMUNICATIONS INC., Tokyo (JP); SONY SEMICONDUCTOR SOLUTIONS CORPORATION, Kanagawa (JP)

(72) Inventors: Hideaki Shoji, Tokyo (JP); Takaaki Hashiguchi, Kanagawa (JP)

(73) Assignees: SONY MOBILE COMMUNICATIONS INC., Tokyo (JP); SONY SEMICONDUCTOR SOLUTIONS CORPORATION, Atsugi (JP)

( * ) Notice: Subject to any disclaimer, the term of this patent is extended or adjusted under 35 U.S.C. 154(b) by 0 days.

(21) Appl. No.: 16/330,098

(22) PCT Filed: Jul. 24, 2017

(86) PCT No.: PCT/JP2017/026739
§ 371 (c)(1),
(2) Date: Mar. 4, 2019

(87) PCT Pub. No.: WO2018/051640
PCT Pub. Date: Mar. 22, 2018

(65) Prior Publication Data
US 2019/0253155 A1 Aug. 15, 2019

(30) Foreign Application Priority Data
Sep. 14, 2016 (JP) ................................. 2016-179897

(51) Int. Cl.
*H04B 13/00* (2006.01)

(52) U.S. Cl.
CPC ........... *H04B 13/005* (2013.01); *H04B 13/00* (2013.01)

(58) Field of Classification Search
CPC .... H04B 17/29; H04B 17/318; H04B 13/005; H04B 13/00
(Continued)

(56) References Cited

U.S. PATENT DOCUMENTS

| | | | |
|---|---|---|---|
| 6,879,809 B1* | 4/2005 | Vega | ................ G06K 7/0008 455/41.1 |
| 2009/0295501 A1* | 12/2009 | Hayashi | ............... H04B 1/0057 333/132 |

(Continued)

FOREIGN PATENT DOCUMENTS

| JP | 2003-324397 A | 11/2003 |
|---|---|---|
| JP | 2007-170995 A | 7/2007 |

(Continued)

OTHER PUBLICATIONS

International Search Report dated Sep. 5, 2017 for PCT/JP2017/026739 filed on Jul. 24, 2017, 14 pages including English Translation.

*Primary Examiner* — Eugene Yun
(74) *Attorney, Agent, or Firm* — Xsensus LLP

(57) ABSTRACT

[Object] To provide an electrode for intra-body communication that can enhance communication performance.
[Solution] According to the present disclosure, the electrode for intra-body communication is used in an electrostatic coupling-type intra-body communication method with a carrier frequency of 40 MHz or less, the electrode including: a first electrode configured to be capacitatively coupled with a human body; and a second electrode having a capacitance of coupling with the human body that is five times or more and 11 times or less with respect to a capacitance at which the first electrode is coupled with the human body. A (Continued)

capacitance of coupling generated between the first electrode and the second electrode is 3 pF or less.

14 Claims, 7 Drawing Sheets

(58) Field of Classification Search
USPC .......................................................... 455/41.2
See application file for complete search history.

(56) References Cited

U.S. PATENT DOCUMENTS

| 2015/0099941 | A1* | 4/2015 | Tran ..................... A61B 5/7214 |
| | | | 600/300 |
| 2016/0338639 | A1* | 11/2016 | Myers .................. A61B 5/4875 |
| 2017/0272128 | A1 | 9/2017 | Tanaka |
| 2017/0332908 | A1 | 11/2017 | Uno |

FOREIGN PATENT DOCUMENTS

| JP | 2008-027219 A | 2/2008 |
| JP | 2016-15553 A | 1/2016 |
| WO | 2016/084610 A1 | 6/2016 |
| WO | 2016/093057 A1 | 6/2016 |

* cited by examiner

100

100

100

ELECTRODE FOR INTRA-BODY COMMUNICATION AND WEARABLE DEVICE

CROSS-REFERENCE TO RELATED APPLICATIONS

The present application is based on PCT filing PCT/JP2017/026739, filed Jul. 24, 2017, which claims priority to JP 2016-179897 filed Sep. 14, 2016, the entire contents of which are incorporated herein by reference.

TECHNICAL FIELD

The present disclosure relates to an electrode for intra-body communication and a wearable device.

BACKGROUND ART

Conventionally, for example, Patent Literature 1 described below describes an intra-body communication electrode having a shape attachable to a part of a human body as a wearable device and being assumed to obtain sufficient signal intensity in intra-body communication.

CITATION LIST

Patent Literature

Patent Literature 1: JP 2016-15553A

DISCLOSURE OF INVENTION

Technical Problem

Patent Literature 1 described above describes a configuration example in a band-shaped device to be winded around a wrist. Nevertheless, in the technology described in Patent Literature 1 described above, there is a possibility that stability in communication is impaired by an operation failure caused depending on a degree of adhesion of a band portion to a human body, the occurrence of coupling generated by the proximity to a human body of only an electrode on one side, or the occurrence of coupling with a structure to which only an electrode on one side comes close.

In addition, in the technology described in Patent Literature 1 described above, because two electrodes are arranged in a thickness direction of the device, there is such a problem that performance deterioration is caused by capacitive coupling between the electrodes. For suppressing the coupling between the electrodes, it is necessary to secure a distance between the electrodes, but when a distance between the electrodes is secured, the device cannot be sufficiently thinned. In addition, when an area of an electrode member on a side getting away from the human body is reduced in the thickness direction of the device for reducing an amount of coupling between the electrodes, there is such a problem that sufficient capacitance cannot be earned for coupling with the human body, and a communication property deteriorates.

In view of the foregoing, an electrode for intra-body communication that can enhance communication performance has been demanded.

Solution to Problem

According to the present disclosure, there is provided an electrode for intra-body communication that is used in an electrostatic coupling-type intra-body communication method with a carrier frequency of 40 MHz or less, the electrode including: a first electrode configured to be capacitatively coupled with a human body; and a second electrode having a capacitance of coupling with the human body that is five times or more and 11 times or less with respect to a capacitance at which the first electrode is coupled with the human body. A capacitance of coupling generated between the first electrode and the second electrode is 3 pF or less.

According to the present disclosure, there is provided a wearable device including: a main body portion; a band portion that includes a first band portion extending in a first direction from the main body portion and second band portion extending in a second direction from the main body portion, and is configured to attach the main body portion to a human body; a first electrode for intra-body communication that is arranged such that the first electrode overlaps the first band portion and the second band portion and lies astride the main body portion; and a second electrode for intra-body communication that is provided on the main body portion.

Advantageous Effects of Invention

As described above, according to the present disclosure, it becomes possible to provide an electrode for intra-body communication that can enhance communication performance.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 7A is a schematic diagram illustrating a typical configuration example in which different electrodes are arranged on band portions and a rear of a face portion in a configuration of a wearable communication device to be winded around a wrist or the like.

FIG. 7B is a schematic diagram illustrating a typical configuration example in which different electrodes are arranged on band portions and a rear of a face portion in a configuration of a wearable communication device to be winded around a wrist or the like.

FIG. 7C is a schematic diagram illustrating a typical configuration example in which different electrodes are arranged on band portions and a rear of a face portion in a configuration of a wearable communication device to be winded around a wrist or the like.

MODE(S) FOR CARRYING OUT THE INVENTION

Figure 1:
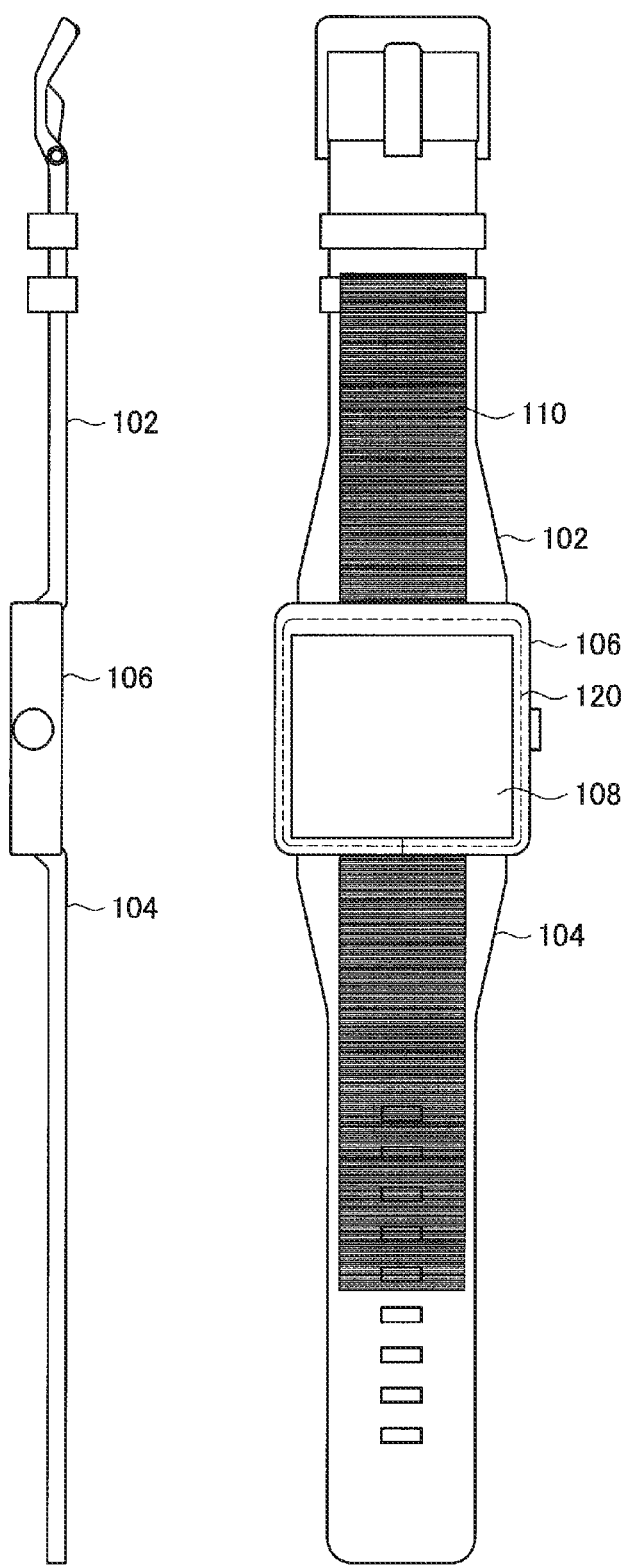
FIG. 1 is a schematic diagram illustrating an external appearance of a communication device according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. Overview of Electric Field Communication According to Present Embodiment
2. Configuration Example of Communication Device According to Present Embodiment
3. Example of Variation of Electrode Structure 1. Overview of Electric Field Communication According to Present Embodiment Electric field communication is a communication method that uses an electric field variation, unlike radio communication that uses electromagnetic waves. A transmission side generates a variable electric field on the periphery by applying a voltage corresponding to data to be transmitted, to two transmission electrodes. A reception side receives the data by placing two reception electrodes connected through a receiving circuit, in the variable electric field, and detecting a variable electric current generated between the two reception electrodes, using the receiving circuit.

As a standardization specification of the communication method, there is ISO/IEC 17982 Closed Capacitive Coupling Communication Physical Layer Edition 1 or IEEE 802.15.6 Human Body Communication. While these are different in signal format or the like, transmission principles are similar as described above. In particular, the former adopts a Manchester code for allocating digital data of 0 or 1 that is to be transmitted, to a falling or rising edge of a waveform. The description will now be given using the method as an example.

Hereinafter, an example of a quasi-electrostatic field communication method will be described. A transmission circuit on a transmission side performs Manchester coding of data to be transmitted, converts the resultant data into a voltage, and applies the voltage to two transmission electrodes. This generates a variable electric field on the periphery of the electrodes. On a reception side, a transient electric current flows between two reception electrodes through a receiving circuit in accordance with an electric potential difference between the two reception electrodes placed in the generated variable electric field. Here, for simplifying the description, it is assumed that the two reception electrodes having the same shape and size are arranged at an interval d, and an electric field E near the reception electrodes is uniform and varies in a stepped manner at a time t=0. At this time, an electric potential difference V(t) between the two electrodes is represented by;

$$V(0)=Ed,$$

but because the two electrodes are connected by the receiving circuit with an impedance Z, an electric charge moves between the two reception electrodes in accordance with the electric potential difference, and the same electric potential is obtained at t→∞. At this time, an electric current i flowing in the impedance Z is represented by;

$$i=V(t)/Z.$$

In each of the two reception electrode, electrostatic induction is caused in accordance with the electric field E. Among these, an electric charge serving as an electric line of force that is received between the two reception electrodes is considered to flow through the impedance Z like a transient response.

In a case where the quasi-electrostatic field communication method is used near a human body, an electric field near the reception electrodes is decided from a plurality of factors. It is assumed that a human body serving as a conducting body is in contact with one of two transmission electrodes and one of two reception electrodes. Nevertheless, the electrodes and the human body are insulated from each other. In this case, an electric field produced by the transmission electrodes is decided by an electric line of force generated in a space and reaching the vicinity of the reception electrodes, and an electric line of force produced especially by an electric charge existing near the reception electrodes among electric charges generated by electrostatic induction on the human body. At this time, the electrostatic induction on the human body largely contributes to a variable electric field. Thus, intra-body communication in which a signal is transmitted when one of the transmission electrodes and one of the reception electrodes come into contact with the human body can be implemented.

In view of the foregoing, mounting on a device to be worn can be considered as an application example of the quasi-electrostatic field communication. For example, transmission electrodes are mounted on a wearable device to be worn by a user, and reception electrodes are installed on a facility such as a door and a floor. At this time, capacitive coupling is generated between the transmission electrodes and a human body, between the reception electrodes and the human body, between the transmission electrodes and the facility, and between the reception electrodes and the facility. As described above, a variable electric field generated by electrostatic induction on the human body largely contributes to an electric line of force, and if a communication status is good, even in a case where the human body and the reception electrodes on the facility side keep a certain degree of distance without contacting each other, intra-body communication can be implemented. Thus, a communication status can be determined on the basis of a size of the distance, and it can be said that, as a distance at which intra-body communication can be performed becomes larger, a communication status becomes better.

In addition, for example, in a case where transmission electrodes are mounted on a wearable device to be attached to a wrist, and reception electrodes are arranged on a facility such as a door, a communication status varies in accordance with a direction of the wearable device. There arises such a situation that, in a case where the wearable device faces one direction, intra-body communication can be performed even when the human body and the facility keep an appreciable extent of distance, but in a case where the wearable device faces another direction, intra-body communication cannot be performed unless the human body and the facility are brought closer to each other. In addition, for example, there also arises such a situation that, in a case where a wearable device to be attached to a wrist is attached to a right wrist, in a case where the right hand is brought closer to the facility side, intra-body communication is enabled even when the right hand and the facility are distant from each other by an appreciable extent of distance, but in a case where a left hand to which the wearable device is not attached is brought closer to the facility side, intra-body communication is not enabled unless the left hand and the facility are brought closer to each other to obtain a smaller distance therebetween.

Thus, in a case where intra-body communication is performed using the quasi-electrostatic field communication method, by improving a communication status to a good communication status, communication is enabled even when a human body and a facility are more distant from each other, and in addition, communication is enabled without being subject to the restrictions of a direction of a wearable device and a position on a human body to which the wearable device is attached.

Figure 3:
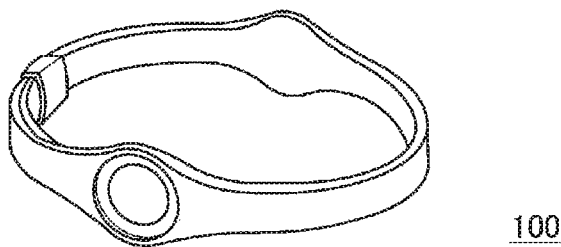
FIG. 3 is a schematic diagram illustrating another example of an external appearance of the communication device.
Figure 4:
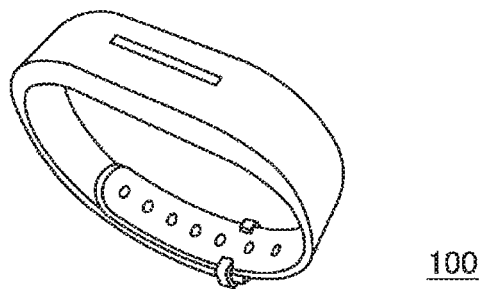
FIG. 4 is a schematic diagram illustrating another example of an external appearance of the communication device.

Patent Literature 1 described above describes a configuration example in a band-shaped device to be winded around a wrist. FIGS. 3 and 4 of Patent Literature 1 illustrate electrode structures and component layout examples of different configuration examples. In a configuration in FIG. 3 of Patent Literature 1, a face portion (block 31) includes not an electrode but a communication module and a battery thereinside, and two belt portions extending from the face portion are respectively formed as two electrode units (first electrode member 13A, second electrode member 13B). In this structure, because the two electrode members are arranged in a band portion in an overlapped manner, an operation failure is caused in accordance with a degree of adhesion of the band portion to a human body. In addition, because coupling is generated with the human body or a structure to which an electrode member is brought close only in an electrode member on one side out of the two electrode members, there is a possibility that stability of communication is impaired.

In addition, in a configuration in FIG. 4 of Patent Literature 1, because two electrode members are arranged in the face portion (block 31) in such a manner that their planes face each other in a thickness direction, performance deterioration is caused by coupling between the electrodes. For reducing the coupling between the electrodes, it is necessary to secure a distance between the electrodes, and in this case, it is difficult to sufficiently thin the device. In addition, when an area of an electrode member on a side getting away from the human body is reduced in the thickness direction for reducing an amount of coupling between the electrodes, sufficient capacitance cannot be earned for coupling with the human body, and a property deteriorates. Furthermore, from a result of an experiment conducted by the present inventor and the like, it has been revealed that, in the configuration described in Patent Literature 1, a property easily varies in accordance with the orientation of an angle of a wrist. In view of the above points, the present disclosure provides an electrode structure that can enhance communication performance more. Hereinafter, an embodiment according to the present disclosure will be described in detail.

2. Configuration Example of Communication Device According to Present Embodiment FIG. 1 is a schematic diagram illustrating an external appearance of a communication device 100 according to an embodiment of the present disclosure. The communication device 100 is formed as a wristwatch-type wearable device. The communication device 100 includes two band portions 102 and 104 and a face portion 106. The face portion 106 is provided with a display portion 108. Note that the drawing on the left side in FIG. 1 illustrates a side view of the band portions 102 and 104 and the face portion 106 viewed from the side, and the drawing on the right side in FIG. 1 illustrates a view of the band portions 102 and 104 and the face portion 106 viewed from the front.

The communication device 100 includes two electrodes 110 and 120 for performing electric field communication. As illustrated in FIG. 1, the electrode 110 is arranged on the two band portions 102 and 104 in such a manner as to lie astride the face portion 106. The electrode 110 is provided integrally with the band portions 102 and 104 by insert molding or a printing technology. The electrode 110 is connected to a circuit substrate provided in the face portion 106, via a contact point formed by conductive rubber, screw fastening, a pogo pin, a plate spring, or the like. As an example, the electrode 110 is arranged on the front sides of the band portions 102 and 104, and the electrode 120 is arranged on the rear surface side of the face portion 106, that is to say, a human body side.

Figure 2:
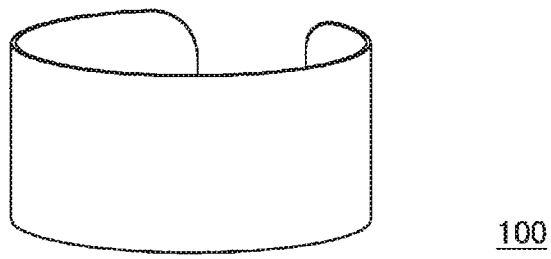
FIG. 2 is a schematic diagram illustrating another example of an external appearance of the communication device.

FIGS. 2 to 4 each illustrate another example of an external appearance of the communication device 100. The present embodiment can be applied to communication devices 100 having various types of shapes. In addition, the present embodiment can also be applied to wearable devices other than the wristwatch-type wearable device.

Figure 5:
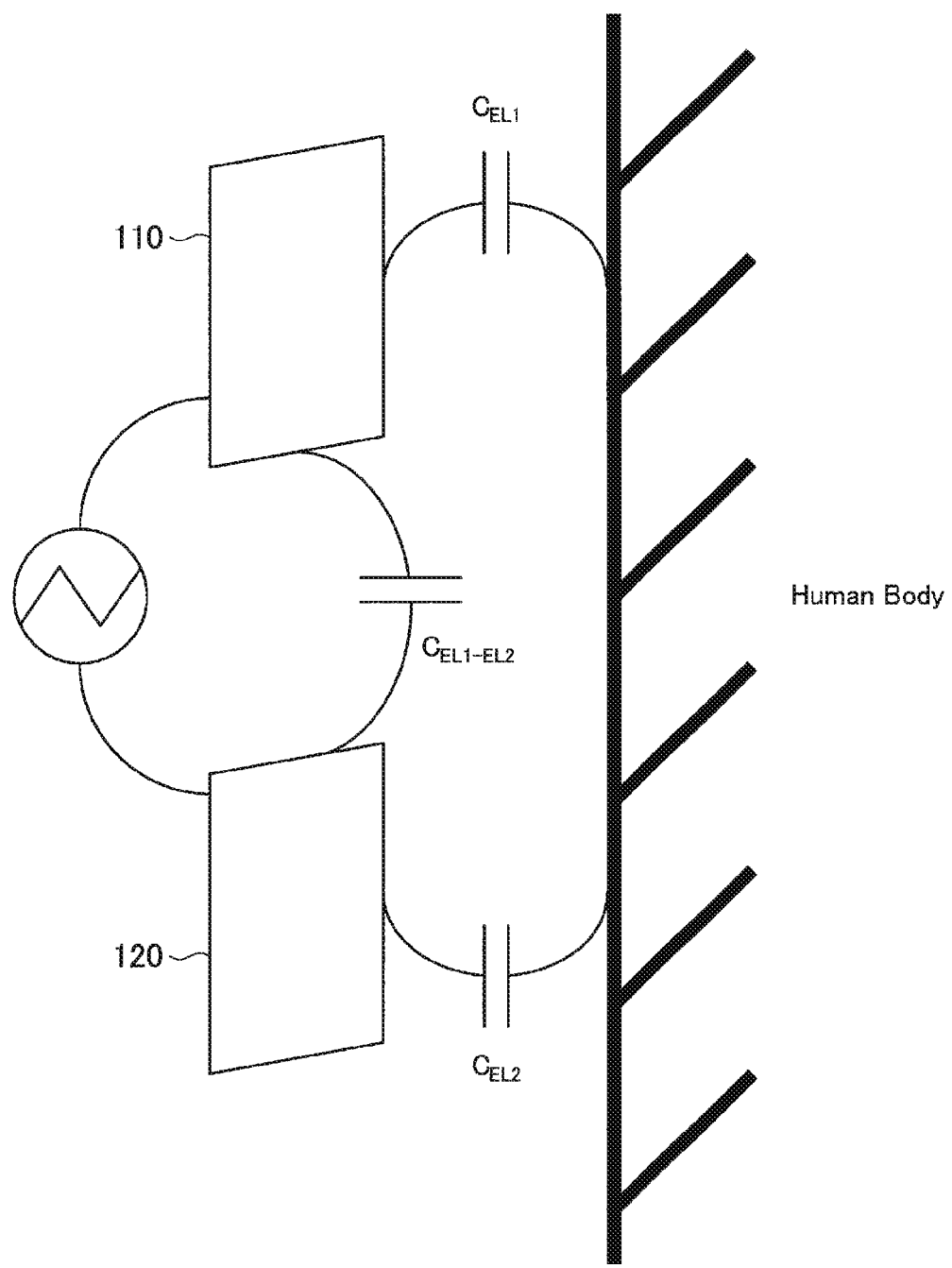
FIG. 5 is a schematic diagram illustrating capacitances $C_{EL1}$ and $C_{EL2}$ generated between two electrodes included in the communication device and a human body, and a capacitance $C_{EL1-EL2}$ generated between the two electrodes.

FIG. 5 is a schematic diagram illustrating capacitances $C_{EL1}$ and $C_{EL2}$ generated between the two electrodes 110 and 120 included in the communication device 100 and a human body, and a capacitance $C_{EL1\text{-}EL2}$ generated between the two electrodes. In the present embodiment, a device of intra-body communication that is equipped with a quasi-electrostatic field communication circuit with a carrier frequency of 40 MHz or less is targeted. In particular, in the present embodiment, when the two electrodes 110 and 120 on a human body side and an emission side are surface-mounted, in a relationship between an area facing the human body and a distance, the electrodes 110 and 120 are formed in such a manner that capacitances of the both electrodes 110 and 120 at which the both electrodes 110 and 120 are coupled with the human body become the same capacitance within a range of seven times (preferably, equal to or larger than five times and equal to or less than 11 times), and coupling generated between the two electrodes 110 and 120 becomes low coupling with a capacitance of 3 pF or more.

Figure 6:
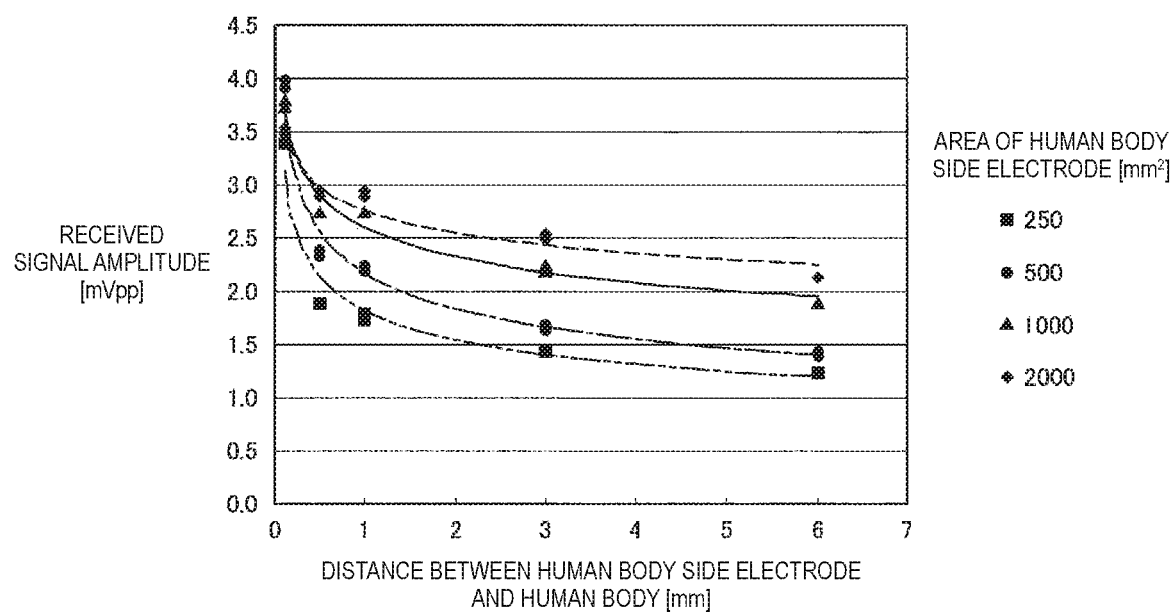
FIG. 6 is a property diagram illustrating a relationship between a distance between an electrode and a human body, an area of the electrode, and a received signal amplitude.

In the study of the present inventor and the like, it has been revealed that a property largely varies depending on coupling capacitances of the electrodes 110 and 120 with respect to the human body, and communication is enabled more surely by increasing areas of the electrodes 110 and 120. FIG. 6 is a property diagram illustrating a relationship between a distance between an electrode and a human body, an area of the electrode, and a received signal amplitude. As illustrated in FIG. 6, a received signal amplitude declines as a distance between the electrode and the human body decreases, and declines as an electrode area decreases. A magnitude of a coupling capacitance can be represented by a formula of a capacitor if an end portion effect is not considered, that is to say, an area of an electrode facing the human body and a distance therebetween become dominant. Then, the study of the present inventor and the like has revealed that, in a case where capacitances formed by the two electrodes 110 and 120 are independently considered, stable communication can be realized by a parameter group that makes consideration in such a manner that these capacitances become the same within a range of about seven times (preferably, equal to or larger than five times and equal to or less than 11 times). At the same time, at this time, it is important to form capacitive coupling of the two electrodes 110 and 120 to be certain low coupling, and in the study of the present inventor and the like, forming the capacitive coupling to be loose coupling with 3 pF or less serves as a guideline for operating intra-body communication with a stable property. The value 3 pF is calculated from a distance between electrodes and a facing area ratio.

Figure 7A:
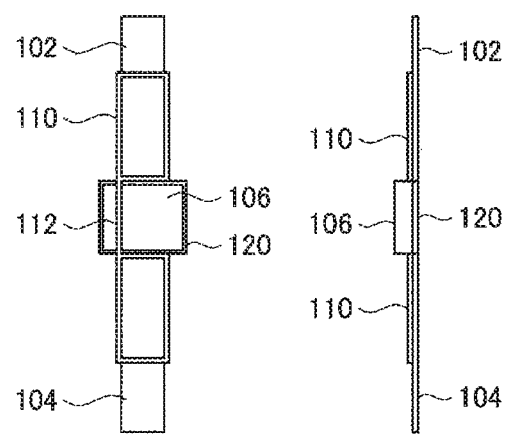
Figure 7B:
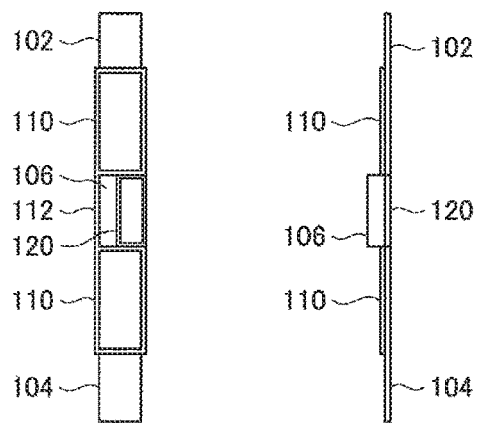
Figure 7C:
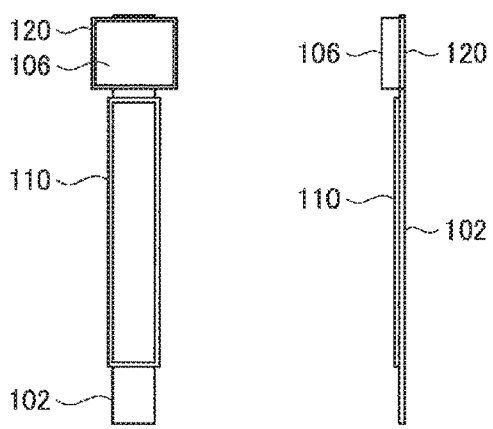

FIGS. 7A to 7C each illustrate a typical configuration example in which different electrodes 110 and 120 are arranged on the band portions 102 and 104 and a rear of the face portion 106 in a configuration of a wearable communication device 100 to be winded around a wrist or the like as illustrated in FIGS. 1 to 4. In each of FIGS. 7A to 7C, the drawing on the left side illustrates a front perspective view of the band portions 102 and 104 and the face portion 106, and the drawing on the right side illustrates a side perspective view of the band portions 102 and 104 and the face portion 106. In the case of a configuration in which the face portion 106 is vertically sandwiched by the two band portions 102 and 104 as in a normal watch, because the two electrodes 110 and 120 come close to each other in the face portion 106, as an amount of coupling generated at the time, an optimum parameter is decided considering the above-described coupling capacitance.

As described above, in the present embodiment, a carrier frequency is set to 40 MHz or less. In this frequency band, the electrodes 110 and 120 need not always be formed by a flat plate, and even if a slot structure in which only outlines of the electrodes 110 and 120 are formed into a frame shape and the inside of the frames are opened is employed, because the size of holes is sufficiently small with respect to the frequency, performance equivalent to that obtainable in a case where electrodes are formed by a flat plate without providing holes can be guaranteed. Thus, the electrodes 110 and 120 illustrated in FIGS. 7A to 7C may be formed by a flat plate throughout the occupying range, or an opened structure in which only an outline of an occupying range is formed into a frame shape may be employed.

The configuration illustrated in FIG. 7A includes a first electrode 110 arranged on the two band portions 102 and 104 astride the face portion 106, and a second electrode 120 arranged on the face portion 106. Because the first electrode 110 is arranged on the two band portions 102 and 104, and the second electrode 120 is arranged on the face portion 106, an area of the first electrode 110 becomes larger than an area of the second electrode 120. The first electrode 110 and the second electrode 120 can be thereby formed to have different capacitances when being coupled with the human body. In addition, by adjusting a width of a joint portion 112 of the first electrode 110 that lies astride the face portion 106, capacitive coupling of the two electrodes 110 and 120 can be formed to be certain low coupling. The configuration illustrated in FIG. 7B is a configuration similar to that in FIG. 7A, but illustrates an example in which the face portion 106 is formed to be smaller than that in FIG. 7A, and an area of the second electrode 120 is made smaller than that in FIG. 7A.

FIG. 7C illustrates a configuration example in which only one band portion 102 is provided, and the face portion 106 is provided at one end of the band portion 102. In this configuration, by joining another end of the band portion 102 to a side of the face portion 106 to which the band 102 is not connected, the communication device 100 is attached to an arm. As in FIG. 7C, in the configuration in which the face portion 106 is connected to a distal end of the band portion 102, an area of the first electrode 110 provided on the band portion 102 can be made larger than an area of the second electrode 120 provided on the face portion 106 without providing the first electrode 110 astride the face portion 106, and a simpler configuration can be obtained.

Figure 8:
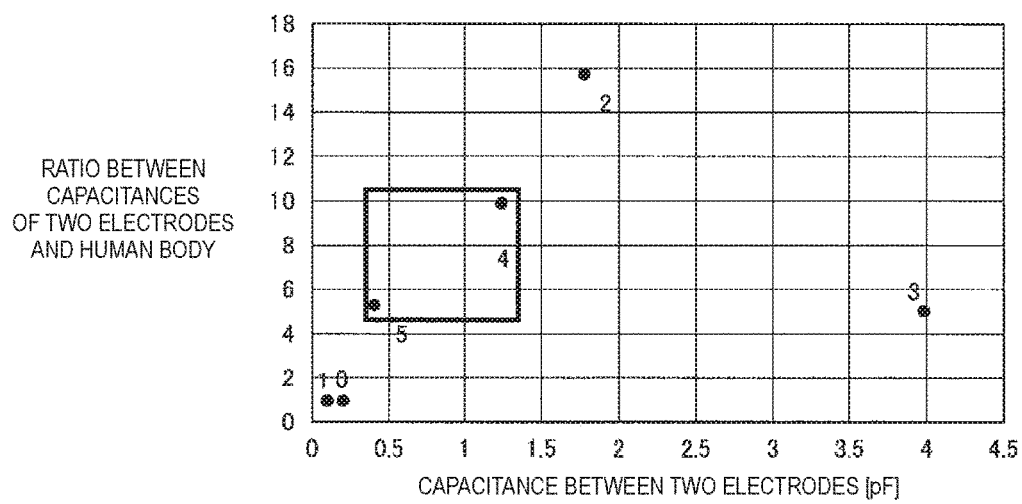
FIG. 8 is a schematic diagram illustrating a correlationship between a ratio between capacitances, a capacitance between a first electrode and a second electrode, and communication performance when capacitances formed by the first electrode and the second electrode are independently changed.

FIG. 8 is a schematic diagram illustrating a correlationship between a ratio between a capacitance between the first electrode 110 and the human body and a capacitance between the second electrode 120 and the human body (vertical axis), a capacitance between the first electrode 110 and the second electrode 120 [pF](horizontal axis), and an evaluation score (five-level evaluation of 0 to 5) indicating a communication distance and stability of communication, when a capacitance formed between the first electrode 110 and the human body and a capacitance formed between the second electrode 120 and the human body are independently changed in seven patterns of A to I. In addition, Table 1 provided below indicates, for each example of A to I, a capacitance between the first electrode 110 and the human body [pF], a capacitance between the second electrode 120 and the human body [pF], a capacitance between the first electrode 110 and the second electrode 120 [pF], a ratio (Ratio) between the capacitance between the first electrode 110 and the human body and the capacitance between the second electrode 120 and the human body, and an evaluation score (Score).

TABLE 1

| | Capacitance between first electrode 110 and human body [pF] | Capacitance between second electrode 120 and human body [pF] | Capacitance between electrodes [pF] | Ratio | Score |
|---|---|---|---|---|---|
| A | 1.59 | 7.97 | 3.98 | 5.012579 | 3 |
| B | 4.13 | 4.13 | 0.09 | 1 | 2 |
| C | 1.3 | 1.3 | 0.1 | 1 | 1 |
| D | 0.83 | 0.83 | 0.2 | 1 | 0 |
| E | 0.83 | 8.26 | 1.24 | 9.951807 | 4 |
| F | 1.5 | 7.98 | 0.4 | 5.32 | 5 |
| I | 1.59 | 25 | 1.77 | 15.72327 | 2 |

The evaluation score illustrated in FIG. 8 indicates a communication distance and stability of communication, and a larger value indicates a longer communication distance and higher stability of communication. For example, in a case where a user wearing the communication device 100 including the two electrodes 110 and 120 for transmission comes close to a communication device (including the above-described facility such as a door and a floor) that is equipped with two electrodes for reception and serves as a communication partner, a distance at which communication with the communication device via the human body is enabled is indicated by the communication distance, and as the communication distance becomes longer, communication performance becomes higher. The stability of communication is an index indicating whether communication can be performed in a case where a user wearing the communication device 100 changes the orientation of the communication device 100, and if communication can be performed even when the communication orientation is largely changed, the stability of communication becomes higher. In addition, the stability of communication is an index indicating whether communication can be performed in a case where a user wearing the communication device 100 on one arm brings another arm closer to a communication device equipped with two electrodes for reception, and if communication can be performed even when a distance between the other arm and the communication device is increased, the stability of communication becomes higher.

As a result of the study of the present inventor and the like, as illustrated in FIG. 8, as a result of evaluating a communication state while changing a capacitance between the first electrode 110 and the human body [pF], a capacitance between the second electrode 120 and the human body [pF], and a capacitance between the both electrodes [pF], it has been revealed that a good communication state can be obtained in a case where a ratio between capacitances between the two electrodes 110 and 120 and the human body is in a range of five to 11 times, and a capacitance between the two electrodes 110 and 120 is in a range of 0.3 to 1.3 [pF] (in the case of a range indicated by a thick frame illustrated in FIG. 8).

Table 2 provided below indicates ranges of parameters conceivable in practical designs that consider restrictions such as the size of a device, in a configuration of a wearable communication device 100 to be winded around a wrist or the like. In Table 2, t denotes a width of an electrode in a direction orthogonal to a longitudinal direction, w denotes a length of an electrode in the longitudinal direction, and d denotes a distance between an electrode and a human body. As indicated in Table 2, a capacitance between the first electrode 110 on the band portions 102 and 104 side and the human body is about 3 to 7 [pF], and a capacitance between the second electrode 120 on the face portion 106 side and the human body is about 1 to 4 [pF]. In addition, a capacitance between the first electrode 110 on the band portions 102 and 104 side and the human body is 6.64 [pF] at a maximum, and a capacitance between the second electrode 120 on the face portion 106 side and the human body is 0.93 [pF] at a minimum. Thus, a capacitance between the first electrode 110 and the human body with respect to a capacitance between the second electrode 120 and the human body is about 6.64/0.93=7.1 at a maximum. Thus, even when practical design conditions are considered, it is preferable to set a ratio between the capacitance of the first electrode 110 and the capacitance of the second electrode 120 to 7 or less.

TABLE 2

| Design example | C [pF] | t[mm] | w[mm] | d[mm] | ipsion | |
|---|---|---|---|---|---|---|
| Band side | 4.43 | 15 | 100 | 3 | 1 | 8.854E−12 |
| | 2.95 | 10 | 100 | 3 | 1 | 8 854E−12 |
| | 5.31 | 15 | 120 | 3 | 1 | 8.854E−12 |
| | 6.64 | 15 | 150 | 3 | 1 | 8.854E−12 |
| | 5.31 | 15 | 80 | 2 | 1 | 8.854E−12 |
| | 4.43 | 10 | 100 | 2 | 1 | 8.854E−12 |
| | 3.98 | 15 | 150 | 0 | 1 | 8.854E−12 |
| Face rear | 3.98 | 15 | 15 | 0.5 | 1 | 8.854E−12 |
| | 1.99 | 15 | 15 | 1 | 1 | 8.854E−12 |
| | 2.21 | 20 | 10 | 0.8 | 1 | 8.854E−12 |
| | 1.33 | 10 | 15 | 1 | 1 | 8 854E−12 |
| | 0.93 | 7 | 15 | 1 | 1 | 8.854E−12 |
| | 3.98 | 30 | 15 | 1 | 1 | 8 854E−12 |
| | 3.54 | 20 | 20 | 1 | 1 | 8.854E−12 |
| Electrode coupling | 0.30 | 5 | 20 | 3 | 1 | 8.854E−12 |
| | 1.33 | 5 | 30 | 1 | 1 | 8.854E−12 |

3. Example of Variation of Electrode Structure

Figure 9:
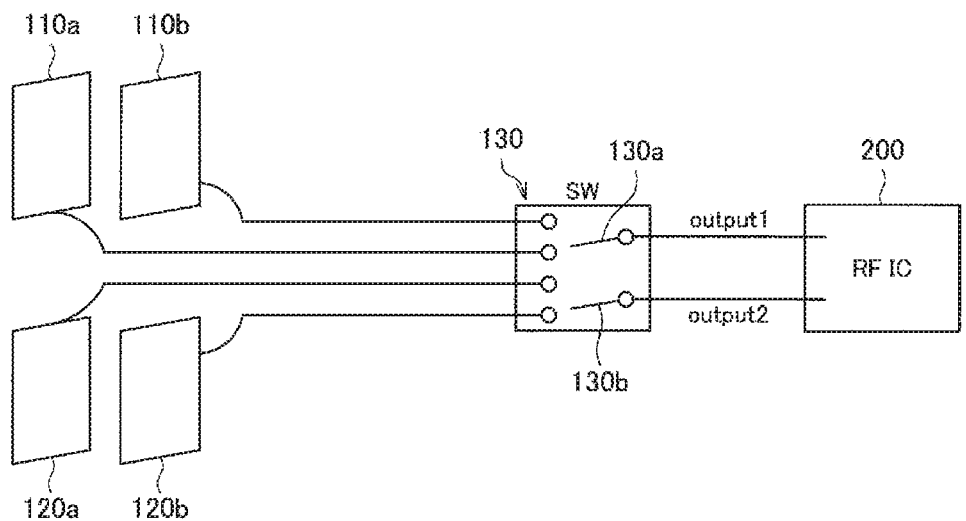
FIG. 9 is a schematic diagram illustrating a configuration in which, in the communication device, a plurality of electrodes of band portions and a face portion are provided, and the plurality of electrodes are adaptively switched using a switch for performance improvement.

A configuration example illustrated in FIG. 9 illustrates a configuration in which, in the communication device 100, a plurality of electrodes 110 and 120 of the band portions 102 and 104 and the face portion 106 are provided, and the plurality of electrodes are adaptively switched using a switch 130 for performance improvement. This makes stable communication realizable in a case where the electrodes 110 and 120 have a load impedance difference and a difference in coupling capacitance with the human body or in a case where the conditions are biased. In the example illustrated in FIG. 9, two electrodes 110a and 110b having areas relatively large and different from each other are provided, and two electrodes 120a and 120b having areas relatively small and different from each other are provided. By switching a switch 130a, the electrode 110a and the electrode 110b having large areas can be switched, and in addition, by switching a switch 130b, the electrode 120a and the electrode 120b having small areas can be switched. Electrodes respectively selected by the switches 130a and 130b are connected with a communication circuit (RF IC) 200. Because switching control affects communication throughput, depending on an application system, interrupt processing is sufficiently considered.

Figure 10:
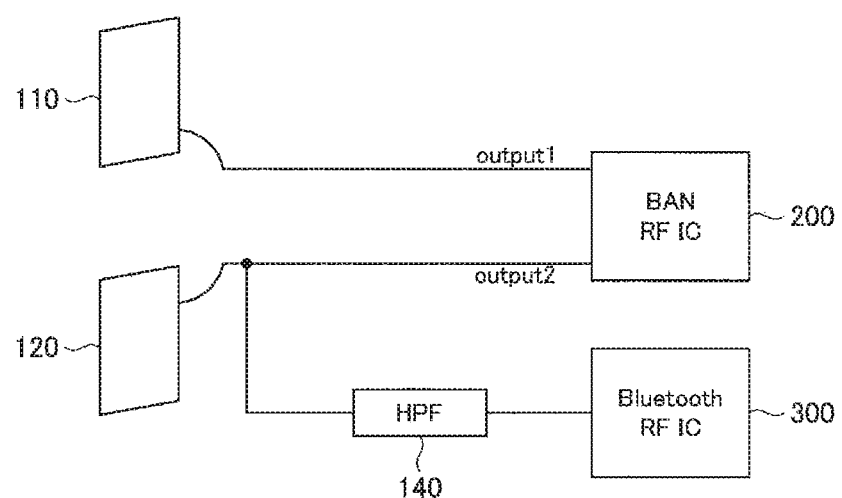
FIG. 10 is a schematic diagram illustrating a structure in which, in the communication device, electrodes on band portions and a rear of a face portion serve as an antenna of another communication method such as Bluetooth (registered trademark) or a coil electrode of a wireless charging system.

The configuration example illustrated in FIG. 10 illustrates a structure in which, in the communication device 100, at least one of the electrode 110 or 120 provided on the band portions 102 and 104 or the face portion 106 serves as an antenna of another communication method such as Bluetooth (registered trademark) or a coil electrode of a wireless charging system. As illustrated in FIG. 10, a Bluetooth (registered trademark) communication circuit (RF IC) 300 is connected to the second electrode 120 via a highpass filter (HPF) 140.

The antenna sharing in two or more radio communication systems can be mainly performed by two methods. A first method is a method of switching an antenna to be used, in a time divisional manner using switch, and a second method is a method of using an antenna in a frequency divisional manner and utilizing a branching filter. The former uses a switch and the latter uses a branching filter.

In the intra-body communication handled in the present disclosure, for efficiently generating an electric field, a characteristic impedance on a circuit side is several kΩ and very high, and high impedance is required also for an antenna electrode. In addition, when proximity to the ground of the circuit is caused before emission, capacitance is generated in the earth and a property significantly deteriorates. Thus, it is difficult to perform long-distance transmission using a stripline or the like from the RF circuit to the antenna electrode. In other words, a switch or a 50Ω system branching filter cannot be used. Thus, in the sharing with a communication system such as the Bluetooth (registered trademark), the highpass filter 140 is inserted into a power supply point of these, and a frequency band to be used in the intra-body communication is adjusted to an open circuit impedance. In contrast, for sharing with a system operating at lower frequency than that in the intra-body communication, such as Qi, a lowpass filter is inserted and an effort is made for enhancing isolation between two power supply points.

Figure 11:
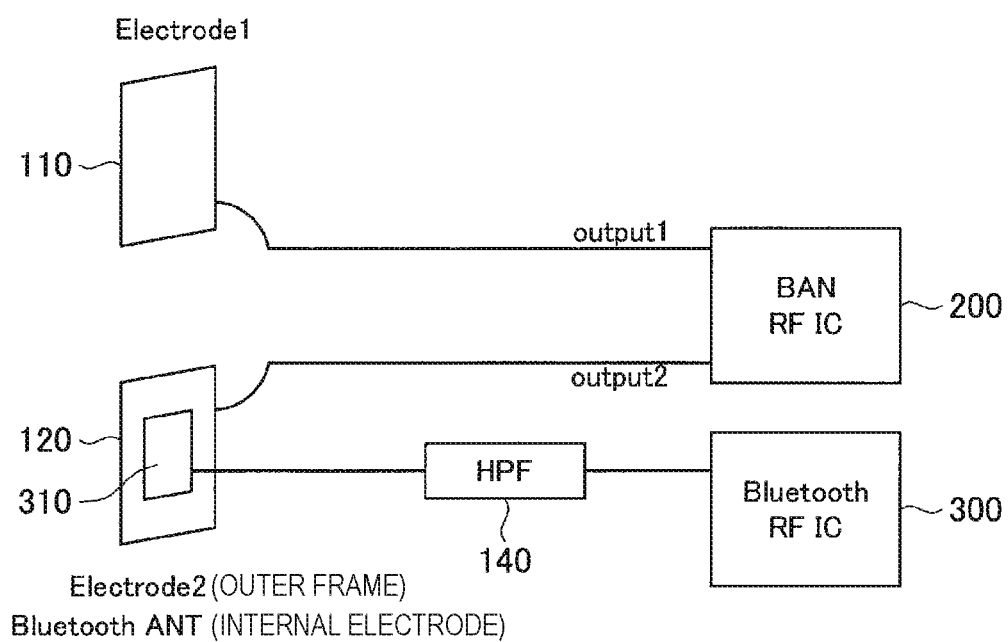
FIG. 11 is a schematic diagram illustrating an example in which a second electrode is formed into a frame shape and a Bluetooth (registered trademark) antenna is arranged inside a frame of the second electrode.

FIG. 11 illustrates an example in which the second electrode 120 is formed into a frame shape, and a Bluetooth (registered trademark) antenna 310 is arranged inside the frame of the second electrode 120. In this manner, an electrode of intra-body communication and an antenna of another communication system may be separately formed. As described above, even when only an outline of the second electrode 120 is formed into a frame shape and the inside of the frame is opened, because the size of a hole is sufficiently small with respect to a frequency, performance equivalent to that obtainable in a case where an electrode is formed by a flat plate without providing a hole can be guaranteed. On the other hand, because the Bluetooth (registered trademark) antenna 310 has high carrier frequency, the size of the hole can be made sufficiently small. In the example illustrated in FIG. 11, by arranging the antenna 310 inside the frame of the second electrode 120, the second electrode 120 of intra-body communication and the Bluetooth (registered trademark) antenna 310 can be formed on the same substrate. Note that because coupling is generated between the electrode 120 and the antenna 310, it is desirable to provide a highpass filter 140.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An electrode for intra-body communication that is used in an electrostatic coupling-type intra-body communication method with a carrier frequency of 40 MHz or less, the electrode including:

a first electrode configured to be capacitatively coupled with a human body; and a second electrode having a capacitance of coupling with the human body that is five times or more and 11 times or less with respect to a capacitance at which the first electrode is coupled with the human body, in which a capacitance of coupling generated between the first electrode and the second electrode is 3 pF or less.

(2)

The electrode for intra-body communication according to (1), in which a capacitance of coupling generated between the first electrode and the second electrode is 0.3 pF or more and 1.3 pF or less.

(3)

The electrode for intra-body communication according to any of (1) and (2), in which the first electrode and the second electrode are selected from among a plurality of electrodes by a switch.

(4)

The electrode for intra-body communication according to any of (1) to (3), in which at least one of the first electrode or the second electrode also serves as an antenna of another communication method different from the intra-body communication method.

(5)

The electrode for intra-body communication according to any of (1) to (4), in which at least one of the first electrode or the second electrode also serves as a coil electrode of a wireless charging system.

(6)

A wearable device including:

a main body portion;

a band portion that includes a first band extending in a first direction from the main body portion and second band extending in a second direction from the main body portion, and is configured to attach the main body portion to a human body;

a first electrode for intra-body communication that is arranged such that the first electrode overlaps the first band and the second band and lies astride the main body portion; and a second electrode for intra-body communication that is provided on the main body portion.

(7)

The wearable device according to (6), in which the first electrode has a width corresponding to a width of the band portion.

(8)

The wearable device according to (7), in which, in a region lying astride the main body portion, the first electrode has a width thinner than that in another region.

(9)

The wearable device according to any of (6) to (8), in which the second electrode is arranged on a surface on a human body side of the main body portion.

(10)

The wearable device according to any of (6) to (9), in which the first electrode is arranged on a surface of the band portion that is on an opposite side of a surface on a human body side.

(11)

The wearable device according to any of (7) to (10), in which the wearable device is used in an electrostatic coupling-type intra-body communication method with a carrier frequency of 40 MHz or less, with respect to a capacitance at which one of the first electrode and the second electrode is coupled with the human body, a capacitance at which another one of the first electrode and the second electrode is coupled with the human body is five times or more and 11 times or less, and a capacitance of coupling generated between the first electrode and the second electrode is 3 pF or less.

(12)

The wearable device according to any of (6) to (11), in which a capacitance of coupling generated between the first electrode and the second electrode is 0.3 pF or more and 1.3 pF or less.

(13)

The wearable device according to any of (6) to (12), in which the first electrode and the second electrode are selected from among a plurality of electrodes by a switch.

(14)

The wearable device according to (11), in which at least one of the first electrode or the second electrode also serves as an antenna of another communication method different from the intra-body communication method.

(15)

The wearable device according to (14), in which the antenna is connected with a circuit of the other communication method via a highpass filter.

(16)

The wearable device according to any of (6) to (15), in which at least one of the first electrode or the second electrode also serves as a coil electrode of a wireless charging system.

(17)

The wearable device according to any of (6) to (16), in which the first electrode is provided on the band portion by insert molding or a printing technology.

(18)

The wearable device according to any of (6) to (17), including a substrate portion on which a circuit is provided, in which a contact point of the first electrode and the substrate portion is formed by conductive rubber, screw fastening, a pogo pin, or a plate spring.

REFERENCE SIGNS LIST 100 communication device
102, 104 band portion
106 face portion
110 first electrode
120 second electrode
140 highpass filter

The invention claimed is:

1. A wearable device comprising:
a main body portion;
a band portion that includes a first band extending in a first direction from the main body portion and second band extending in a second direction from the main body portion, and is configured to attach the main body portion to a human body;
a first electrode for intra-body communication that is arranged such that the first electrode overlaps the first band and the second band and lies astride the main body portion; and
a second electrode for intra-body communication that is provided on the main body portion, wherein
with respect to a capacitance at which one of the first electrode and the second electrode is coupled with the human body, a capacitance at which another one of the first electrode and the second electrode is coupled with the human body is five times or more and 11 times or less.

2. The wearable device according to claim 1, wherein the first electrode has a width corresponding to a width of the band portion.

3. The wearable device according to claim 2, wherein, in a region lying astride the main body portion, the first electrode has a width thinner than that in another region.

4. The wearable device according to claim 1, wherein the second electrode is arranged on a surface on a human body side of the main body portion.

5. The wearable device according to claim 1, wherein the first electrode is arranged on a surface of the band portion that is on an opposite side of a surface on a human body side.

6. The wearable device according to claim 5, wherein the first electrode is arranged on the surface of the band portion that is on the opposite side of the surface on the human body side such that the first electrode does not directly contact the human body.

7. The wearable device according to claim 1, wherein a capacitance of coupling generated between the first electrode and the second electrode is 0.3 pF or more and 1.3 pF or less.

8. The wearable device according to claim 1, wherein the first electrode and the second electrode are selected from among a plurality of electrodes by a switch.

9. The wearable device according to claim 1, wherein at least one of the first electrode or the second electrode also serves as a coil electrode of a wireless charging system.

10. The wearable device according to claim 1, wherein the first electrode is provided on the band portion by insert molding or a printing technology.

11. The wearable device according to claim 1, comprising a substrate portion on which a circuit is provided,
wherein a contact point of the first electrode and the substrate portion is formed by conductive rubber, screw fastening, a pogo pin, or a plate spring.

12. A wearable device comprising:
a main body portion;
a band portion that includes a first band extending in a first direction from the main body portion and second band extending in a second direction from the main body portion, and is configured to attach the main body portion to a human body;
a first electrode for intra-body communication that is arranged such that the first electrode overlaps the first band and the second band and lies astride the main body portion; and
a second electrode for intra-body communication that is provided on the main body portion, wherein
the wearable device is used in an electrostatic coupling-type intra-body communication method with a carrier frequency of 40 MHz or less,
with respect to a capacitance at which one of the first electrode and the second electrode is coupled with the human body, a capacitance at which another one of the first electrode and the second electrode is coupled with the human body is five times or more and 11 times or less, and
a capacitance of coupling generated between the first electrode and the second electrode is 3 pF or less.

13. The wearable device according to claim 12, wherein at least one of the first electrode or the second electrode also serves as an antenna of another communication method different from the intra-body communication method.

14. The wearable device according to claim 13, wherein the antenna is connected with a circuit of the other communication method via a highpass filter.

* * * * *